United States Patent [19]
Bailey et al.

[11] Patent Number: 5,880,885
[45] Date of Patent: *Mar. 9, 1999

[54] HIGH ENTRANCE ANGLE RETROREFLECTIVE ARTICLE AND METHOD OF MAKING

[75] Inventors: Terry R. Bailey, Woodbury; Louis C. Belisle, deceased, late of Oakdale, both of Minn., by Sharon R. A. Guthrie, executor; Larry K. Stump, Hudson, Wis.; Gregory F. Jacobs, Woodbury; David G. Schueler, Forest Lake, both of Minn.; Dale H. Haunschild, Hudson, Wis.

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 671,435

[22] Filed: Jun. 27, 1996

Related U.S. Application Data

[60] Provisional application No. 60/000,707 Jun. 29, 1995 and 60/000,706 Jun. 29, 1995.

[51] Int. Cl.⁶ .................................................. G02B 5/122
[52] U.S. Cl. ........................ 359/529; 359/530; 359/536; 359/539
[58] Field of Search ............................ 359/515, 529–542, 359/546–552, 900; 428/141; 156/60

[56] References Cited

U.S. PATENT DOCUMENTS

| | | | |
|---|---|---|---|
| 3,253,971 | 5/1966 | Garling | 156/246 |
| 3,920,346 | 11/1975 | Wyckoff | 404/14 |
| 3,964,821 | 6/1976 | Eigenmann . | |
| 4,025,159 | 5/1977 | McGrath . | |
| 4,072,403 | 2/1978 | Eigenmann . | |
| 4,145,112 | 3/1979 | Crone et al. . | |
| 4,236,788 | 12/1980 | Wyckoff . | |
| 4,349,598 | 9/1982 | White | 428/161 |
| 4,388,359 | 6/1983 | Ethen et al. | 428/143 |
| 4,505,967 | 3/1985 | Bailey | 428/164 |
| 4,664,966 | 5/1987 | Bailey et al. | 428/203 |
| 4,712,867 | 12/1987 | Malek . | |
| 4,988,541 | 1/1991 | Hedblom | 427/163 |
| 4,988,555 | 1/1991 | Hedblom | 428/172 |
| 5,268,789 | 12/1993 | Bradshaw | 359/534 |
| 5,277,513 | 1/1994 | Flanagan et al. | 404/16 |
| 5,340,231 | 8/1994 | Steere et al. | 404/14 |
| 5,417,515 | 5/1995 | Hachey et al. | 404/15 |

FOREIGN PATENT DOCUMENTS

| | | |
|---|---|---|
| 0 385 746 | 9/1990 | European Pat. Off. . |
| 1 103 487 | 11/1955 | France . |
| 2 557 896 | 7/1985 | France . |
| 665 665 | 5/1988 | Switzerland . |
| WO 87/06996 | 11/1987 | WIPO . |

OTHER PUBLICATIONS

ASTM D 4061–94, Apr. 1994, pp. 461–467.
ASTM E 808–94, Apr. 1994, pp. 715–718.
ASTM E 1347 (Replaced E 97–77), May 1990, pp. 780–783.
ASTM E 303, Feb. 1994, pp. 657–661.
*Patent Abstracts of Japan*, vol. 6, No. 70, (P–113)[948], 6 May 1982 & JP A 57 011301.

*Primary Examiner*—James Phan
*Attorney, Agent, or Firm*—Robert H. Jordan

[57] ABSTRACT

Retroreflective article that provides effective retroreflective brightness at very high entrance angles as well as low entrance angles.

42 Claims, 3 Drawing Sheets

HIGH ENTRANCE ANGLE RETROREFLECTIVE ARTICLE AND METHOD OF MAKING

CROSS-REFERENCE TO RELATED APPLICATIONS

This application claims priority from U.S. Provisional Application Ser. Nos. 60/000,707 and 60/000,706, both filed Jun. 29, 1995.

FIELD OF INVENTION

The present invention relates to a retroreflective article exhibiting high retroreflective brightness at high entrance angles and low entrance angles, and under wet conditions, and a method for making such an article. The article is well suited for use as a pavement marking or as a vertical barrier or delineator marking.

BACKGROUND

Pavement markings, such as those on the centerline and edgeline of a roadway, are important in order to provide visual guidance for motor vehicle drivers. Pavement marking materials are used as traffic control markings for a variety of uses, such as short distance lane striping, stop bars, and pedestrian pavement markings at intersections. A common form of pavement markings is adhesive-backed tape that is applied to the roadway surface in desired location and length; the top surface of the tape having selected color and typically retroreflective characteristics.

Currently, many flat pavement markings rely on an exposed-lens optical system comprising transparent microspheres partially embedded in a binder layer containing pigment particles, e.g., titanium dioxide ($TiO_2$) or lead chromate ($PbCrO_4$), as reflectors. In use, light from the headlamp of a vehicle enters the microsphere and is refracted to fall on the reflective pigment particles. Some portion of the light is returned generally along the original entrance path in the direction of the vehicle so as to be visible to the driver. The amount of refraction and the amount of light gathering of these microspheres is dependent in part upon maintaining a low index of refraction at the air interface on the exposed portion of the microsphere. During rainy periods, the microspheres become wetted with water which reduces the their light refracting ability and results in much reduced retroreflective performance.

One solution to this problem is raised pavement markings in which retroreflective elements are presented in somewhat vertical configurations. U.S. Pat. Nos. 4,388,359 (Ethen et al.), 4,988,555 (Hedblom), and 4,988,541 (Hedblom) disclose pavement markings with protrusions carrying exposed-lens retroreflective elements on the sides thereof.

It is also known to use enclosed-lens retroreflective structures on pavement markings. These structures are typically used as spot guides which are augmented with continuous paint or tape markings. See, e.g., U.S. Pat. Nos. 5,277,513 (Flanagan et al.) and 5,340,231 (Steere et al.). Enclosed-lens retroreflective sheetings with flat cover films (also sometimes referred to as cover sheets, top sheets, top films, etc.) have been constructed as a means for improving wet retroreflectivity. See, e.g., U.S. Pat. No. 4,025,159 (McGrath) which discloses encapsulated-lens retroreflective articles and U.S. Pat. Nos. 4,505,967 (Bailey) and 4,664,966 (Bailey et al.) which disclose embedded-lens retroreflective articles.

U.S. Pat. No. 4,145,112 (Crone) discloses an article comprising an underlying base retroreflective layer and a light directing layer comprised of a longitudinally-extending series of short transparent projections which each have front and back (defined relative to the expected origin of light to be retroreflected) upwardly extending edge surfaces. The front edge surfaces are disposed across (i.e., relatively perpendicular to) the expected path of high-incidence angle light, whereby they transmit rather than reflect away a high percentage of incident light from approaching motor vehicles. The back edge surface is disposed to both reflect light transmitted through the front edge surface to a path within a predetermined angular range for retroreflection by the retroreflective elements, and to reflect light retroreflected by the retroreflective elements back through the front edge surface toward its source. A precise configurational relationship of the front and back upwardly extending edge surfaces of each projection must be established and maintained in order to retain adequate retroreflectivity. In addition, the longitudinally extending projections tend to make such sheeting less flexible. U.S. Pat. No. 4,236,788 (Wyckoff) discloses a related type of pavement marker strip wherein the two sides of the transverse prisms are adjusted to provide for downward internal reflection into the base sheet from one side and refraction to the space between successive prisms into the base sheet from the other side. As with the article disclosed in U.S. Pat. No. 4,145,112, maintenance of a precise configurational relationship between the two upward faces of the prisms is critical.

U.S. Pat. No. 3,920,346 (Wyckoff) discloses a saw-tooth-like marker strip comprising protrusions with curved edges and having upwardly disposed retroreflective members embedded therein. The curved edges of the raised protrusions are said to reduce loss of incident light so that the marker is bright over wide angles of incident light upon the marker strip. In addition, incorporation of upwardly disposed retroreflective members in the protrusions results in a narrower entrance or incidence angle of light from approaching motor vehicles, permitting more effective retroreflection by the article.

U.S. Pat. No. 4,072,403 (Eigenmann) discloses a retroreflective assembly that is particularly useful for situations in which retroreflection is required in rainy conditions. The assembly disclosed therein comprises a transparent globule with a monolayer of transparent microspheres on certain portions of the globule and a reflective layer disposed behind the microspheres. The retroreflective assemblies, sometimes referred to as "globule/microsphere retroreflective assemblies", are positioned on the top surface of a pavement marking where they provide improved retroreflection of light at high incidence angles. U.S. Pat. No. 5,268,789 (Bradshaw) teaches an improved globule/microsphere retroreflective assembly and an improved method for making such an assembly.

EP Patent No. 385746 B1 (Kobayashi et al.) discloses a pavement marking comprising a layer of large glass microspheres embedded on top of retroreflective embedded-lens type base sheeting. The retroreflective pavement marking is said to be particularly useful in rainy conditions because the larger glass microspheres are partially exposed in air. However, the disclosed pavement marking is limited to using microspheres as a light gathering source. Furthermore, the pavement marker is only taught to increase retroreflectivity of its base sheeting at entrance angles of between 60° and 80°. It is known in the art that high-entrance angles, greater than approximately 85°, is more common for pavement marking applications.

Currently available pavement markings provide effective retroreflective response for only a narrower range of entrance angles than is sometimes desired. In addition, currently available pavement markings are not as effective retroreflectors as is desired for some applications. For example, current commercial flat pavement markings, relying on microspheres partially embedded in layers containing pigment particles, are most easily seen at distances of approximately 80 meters and less. At distances greater than this, retroreflective brightness declines due to the relatively larger entrance angles of the incident light and limited retroreflective efficiency. In addition to generally low retroreflectivity at high incidence angles, flat pavement markings are particularly difficult to see under rainy conditions. Raised pavement markings have better wet reflectivity because the rain will run off the raised portions. However, snow removal is frequently a problem on roads bearing raised pavement markings, as the snowplows have a tendency to catch on the raised protrusions and dislodge the markings from the road surface.

The need exists for low profile retroreflective articles that exhibit high retroreflective brightness in a continuous line even at high incidence angles and which retain effective retroreflective brightness at high incidence angles even when wet. As used herein, "low profile" refers to an article low enough to sustain impacts from a snow plow after one winter season with minimal damage to the article. In addition, there exists a need for retroreflective articles exhibiting effective retroreflective response over a wide range of entrance angles for application to vertical surfaces such as guard rails, Jersey barriers, etc.

SUMMARY OF THE INVENTION

The present invention provides novel, preferably low profile, retroreflective articles that provide an unobvious combination of improved retroreflectivity at very high entrance angles (88° or more) such as those at which pavement markings are observed, bright retroreflectivity at low entrance angles, and much greater retroreflectivity under wet conditions than typical pavement markings. The invention also provides a novel method for making such retroreflective articles.

In brief summary, an article of the invention comprises an enclosed-lens retroreflective base sheet and an array of refracting elements on the front surface of the base sheet. The base sheet comprises an array of retroreflective elements beneath a continuous overlying transparent cover layer. The refractive elements are disposed relative to the retroreflective base sheet such that light incident to the array of refracting elements at a high entrance angle is refracted so as to be transmitted into the base sheet and retroreflected by the base sheet. Unlike the refracting elements in the articles disclosed in U.S. Pat. Nos. 4,145,112 and 4,236,788, the front and back sides of the refracting elements of articles of the invention need not possess a precise configuration relative to one another in order to achieve effective retroreflection. Unlike EP Patent No. 385746 B1, the refracting elements are not limited to microspheres. As a result, retroreflective articles of the invention can be very easily and cheaply made. As described herein, the front and back sides of the refracting elements may be rounded, or may have relatively straight profiles. Retroreflective articles of the invention employ refraction at the front surface of the refracting elements to direct light incident at high entrance angles into the base sheeting. As a result, articles of the invention provide surprisingly bright retroreflection and are surprisingly durable.

Retroreflective articles of the invention are particularly well suited for applications where light is incident at high entrance angles greater than about 85°, e.g., at pavement marking geometries. Such applications include pavement markings and applications where the incident light may be from any direction, such as horizontal signs. Illustrative examples of such horizontal signs include the legends and symbols commonly placed on pavement in parking lots to denote handicapped parking, and the arrows and lane markings placed on the pavement at an intersection.

In addition, retroreflective articles of the invention are also well suited for use on vertical surfaces, particularly those that are observed at high incidence angles such as guard rails, building walls along alleys, Jersey barriers, bridge abutments, posts, traffic barrels, etc. An advantage of retroreflective articles of the invention is that in addition to exhibiting improved retroreflective brightness at high incidence angles, they also exhibit high retroreflective brightness at lower entrance angles, e.g., within 30° to 40° of normal, in which signs are often observed. This makes articles of the invention especially well suited for use on walls and barriers along highways and other applications where a vehicle may approach the structure from a wide range of angles at which effective retroreflective brightness is desired. For example, a first road may have a vertical barrier disposed substantially parallel to a portion thereof and a second road may intersect the first road. If the barrier has sheeting of the present invention on the surface thereof, it will provide effective retroreflection to vehicles approaching the barrier on either road, thereby increasing safety. Retroreflective articles of the invention can be used in curved formats, e.g., wrapped around traffic cones and barrels, on curved guardrails, etc., providing excellent retroreflective brightness along essentially the entire visible portion because of the exceptional entrance angularity of the articles.

Unlike an exposed-lens reflective sheeting that will not retroreflect when wet, retroreflective articles of the invention are wet retroreflective. That is, the inventive article will retroreflect during rainy conditions, when the rain has subsided but the article is not yet dried, in the early morning hours when dew has collected on the article, or under similar conditions. In addition, in a pavement marking application the refracting elements provide raised surfaces that also increase the article's retention of wet retroreflectivity by facilitating run-off of water. However, the relatively low profile of the raised surfaces enables the retroreflective article to maintain its utility even in areas where snowplows are used.

In brief summary, the method of the invention comprises: (1) providing a retroreflective base sheet comprising an array of retroreflective elements and a cover layer; and (2) adhering or forming an array of refracting elements on the cover layer, the refracting elements being disposed relative to the base sheet such that light incident to the array is refracted so as to be transmitted into the base sheet, retroreflected by the base sheet, and further refracted by the refracting elements so as to be retroreflected by said article.

The manufacturing process of the retroreflective article of the invention is much simpler relative to previous processes for fabricating retroreflective articles comprising a light-directing layer and a retroreflective base sheet. With previous retroreflective articles such as those disclosed in U.S. Pat. Nos. 4,145,112 and 4,236,788, the light-directing layer must be carefully configured. In contrast the refracting elements of the invention can be randomly placed and randomly shaped on the retroreflective base sheet if desired. Also, impacts and abrasion from road traffic that tend to distort the light-directing layer of previous retroreflective articles will have much less of an effect on the refracting elements of the invention because maintaining a precise configuration is not critical to achieving retroreflection. Finally, because maintenance of precise geometries is not critical, softer more conformable materials can be chosen, thereby enhancing the ability of pavement markings of the invention to stay on the road.

BRIEF DESCRIPTION OF THE DRAWINGS

The invention will be further explained with reference to the drawings, wherein.

These figures, which are idealized and not to scale, are intended to be merely illustrative and non-limiting.

DETAILED DESCRIPTION OF ILLUSTRATIVE EMBODIMENTS OF THE INVENTION

The inventive retroreflective sheeting has a novel optical system that increases the retroreflectivity of a base sheeting at high entrance angles without significantly compromising retroreflectivity at all other entrance angles. "Entrance" angle is defined as the angle between the reference axis and the incidence axis (a glossary of terms is provided at the end of this specification). As used herein, "high entrance angles" mean angles greater than approximately 85°. Because the inventive article is able to retroreflect light at the high entrance angles, it is useful for horizontal applications, such as pavement markings. Because the inventive sheeting has good angularity and also good head-on retroreflective brightness, it is useful for vertical applications, such as delineators and barrier markings. "Head-on" brightness denotes low entrance angles, typically from 0° up to approximately 30° to 40°.

Figure 1:
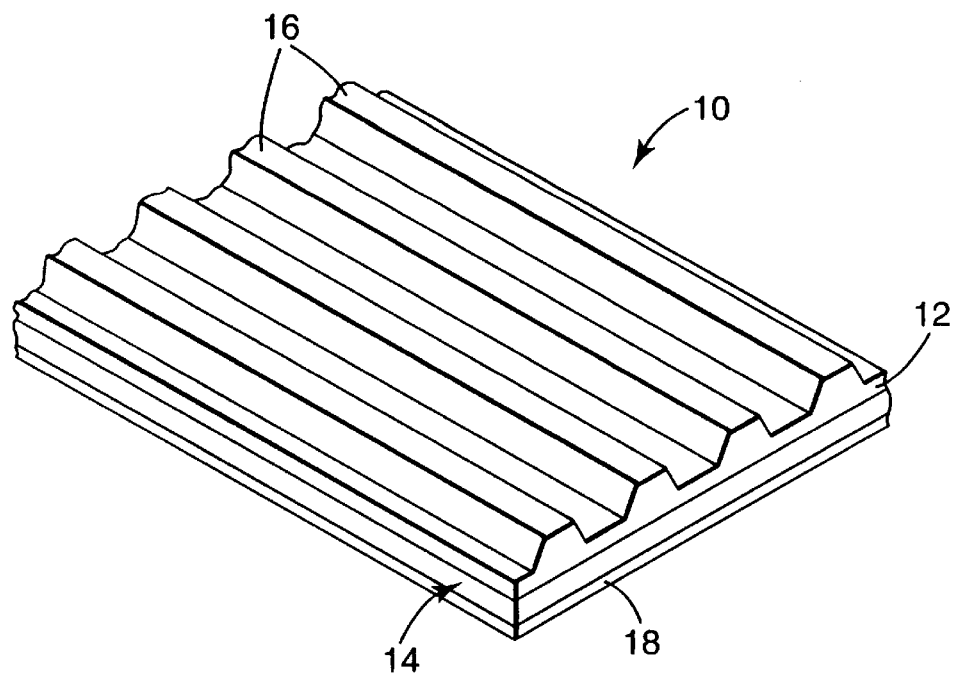
FIG. 1 is a plan view of a previously known pavement marking with a light-directing layer disposed above a base retroreflective layer.
Figure 2:
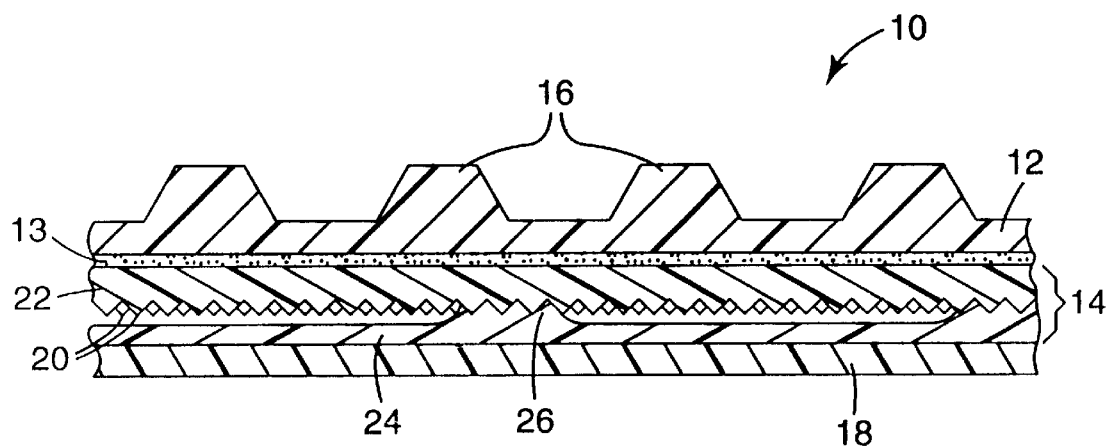
FIG. 2 is a sectional view of the pavement marking shown in FIG. 1.

FIGS. 1 and 2 show a previously known retroreflective article such as is disclosed in U.S. Pat. No. 4,145,112 wherein article 10 comprises light directing layer 12 with internally reflecting projections 16 and underlying retroreflective base sheeting 14 and underlying optional conformance layer 18. Typically such articles would further comprise an adhesive layer (not shown) on the under side of conformance layer 18 by which the article would be bonded to a desired surface, for example, a road surface (not shown). As discussed above, projections 16 utilize internal reflection to redirect high entrance angle light into base sheeting 14 and then utilize internal reflection to redirect light retroreflected by base sheeting 14 back toward the source. Layer 12 is shown adhered to base sheeting 14 with intermediate adhesive layer 13. Base sheeting 14 comprises an array of cube corner retroreflective elements 20 on the back side of its main layer 22 and seal film 24 sealed to main layer 22 with a network of interconnecting bonds 26 to provide the interface on cube corner elements 20 necessary for retroreflection.

I. General Structure of the Inventive Article

Figure 3:
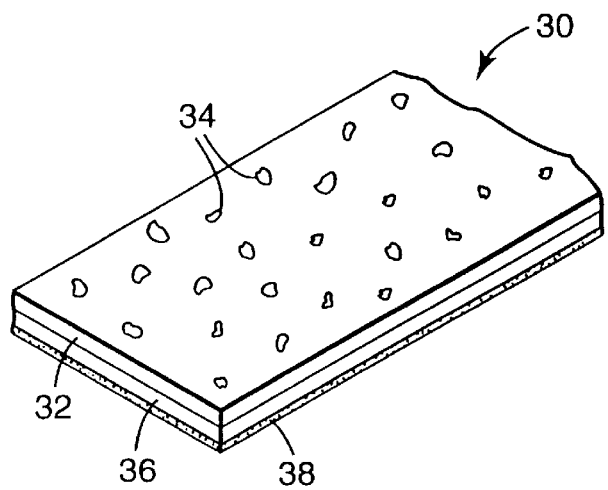
FIG. 3 is a plan view of an illustrative retroreflective article of the invention.

An illustrative retroreflective article of the invention is shown in FIG. 3. Pavement marking 30 comprises retroreflective base sheeting 32 with an array of light refracting elements 34 on the top surface thereof, and optional conformance layer 36 underlying base sheeting 32 and optional adhesive layer 38 underlying conformance layer 36.

Different types of retroreflective sheeting may be used as base sheeting 32. The retroreflective base sheetings typically do not, on their own, provide sufficient retroreflectivity at extremely high entrance angles, for examples at angles of 86° to 89°. However, when these base sheetings are used in a composite article of the invention, very good retroreflective performance at both high entrance and low entrance angles is achieved.

Light refracting elements 34 adhere to the relatively flat front face of the retroreflective base sheeting. Because of their placement, these refracting elements capture light that would ordinarily be specularly reflected at high entrance angles. The captured light is refracted by the refracting elements so as to enter base sheeting 32, is retroreflected by base sheeting 32 and is refracted again so as to be directed towards the originating light source.

A retroreflective article of the invention may contain colorants in at least some portion of it, for example in the refracting elements and/or in one or more components of the base sheeting. Illustrative examples of common colorants include white, yellow, and red, although other colorants may be used as desired.

Also, a thin high abrasion resistance and/or dirt resistance coating may be applied to the top surface of the retroreflective article to protect it form traffic wear and dirt accumulation. Preferably, the coating will be light transmissive and will not reduce the skid resistance of the inventive article.

Figure 4:
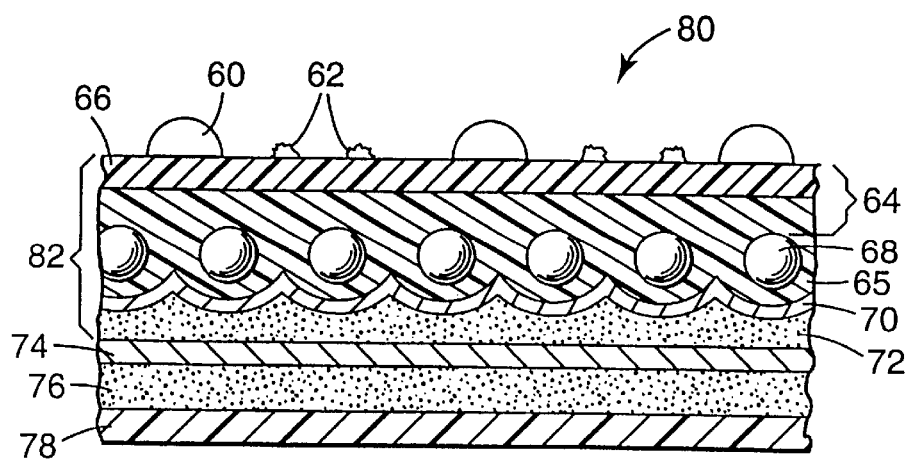
FIG. 4 is a sectional view of another illustrative retroreflective article of the invention.

Another illustrative retroreflective article of the invention is shown in FIG. 4. Pavement marking 80 comprises refracting elements 60, anti-skid particles 62, high angularity retroreflective base sheeting 82, optional conformance layer 74, optional adhesive layer 76, and an optional liner 78. Base sheeting 82 further comprises retroreflective elements 68 embedded in transparent polymer matrix 65, specular coat 70, adhesive layer 72, and cover layer 64 which may comprise optional top film 66. As shown in FIG. 4, refracting elements 60 are substantially hemispherical. Top film 66 may be used to increase adhesion between refracting elements 60 and base sheet 82.

II. Retroreflective Base Sheetings

Different types of retroreflective base sheeting may be used for the present invention. Illustrative examples of retroreflective base sheetings that can be used in the invention include, but are not limited to, embedded-lens retroreflective sheetings and encapsulated-lens retroreflective sheeting (that is, both microsphere type and cube-corner type). Also, a cube-corner sheeting that is specularly coated or metallized on the surface of the cube-corner elements can function as the base sheeting. It is known in the art that metallization of a cube-corner sheeting increases the entrance angularity of the sheeting.

Retroflective base sheetings used in the invention preferably possess good angularity; that is, the base sheetings' retroreflectivity is still substantial at relatively high entrance angles of about 80° or more. All component layers of the retroreflective base sheeting preferably adhere together in all types of weather conditions, even under repeated impact and shear stress resulting from road traffic passing over the sheeting in the case of pavement marking applications.

Illustrative encapsulated-lens sheetings include microsphere-based retroreflective sheetings that comprise a monolayer of transparent microspheres partially embedded in a binder layer with a reflective layer on the rear (i.e., embedded) portions thereof. An air interface is provided by a cover layer disposed in front of the microspheres. Alternatively, a cube-corner type sheeting that comprises a monolayer of cube-corner retroreflective elements having an air interface protected by a sealing layer can also be used. Cube corner type materials wherein the cube corner elements have been covered with a specularly reflective metal layer may also be used. In a cube-corner type sheeting, the cover layer may be an integral part of the cube corner formations or may be an independent film. U.S. Pat. No. 4,025,159 (McGrath) discloses some microsphere type and cube-corner type encapsulated-lens retroreflective sheetings that can be used herein.

Illustrative embedded-lens sheetings include microsphere-based retroreflective sheetings that comprise (1) a monolayer of transparent microspheres whose front and rear surfaces are embedded in a transparent matrix and (2) a reflective layer disposed from the rear surfaces of the microspheres by a selected distance. As used herein, the term cover layer refers to any layer that is in front of the microspheres. U.S. Pat. No. 4,505,967 (Bailey) discloses an embedded-lens retroreflective sheeting that is particularly well suited and preferred for use herein.

Retroreflective base sheets used herein comprise a relatively flat cover layer on the front surface thereof. The cover layer protects underlying components of the base sheet and may be single layer or multilayer. The cover layers are typically polymers but may be other light transmissive material if desired. They can be selected to separately optimize distinct characteristics of the sheeting.

Embedded-lens retroreflective sheetings are typically more preferred than encapsulated-lens retroreflective sheetings when used as pavement markers. It is believed that the solid construction of the embedded-lens sheeting would be more durable when subjected to traffic conditions because it has no internal voids like encapsulated-lens sheeting. Embedded-lens retroreflective sheetings are available in commercial forms that are quite durable and flexible. They are available in embodiments that provide effective bright retroreflective performance at higher entrance angles than many encapsulated-lens systems are capable of. Moreover, the reflective layer in many embedded-lens sheetings is aluminum and aluminum conformance layers are commonly used in pavement marking materials. This similarity may minimize any possible corrosion problems that may arise if different metals were used.

Microsphere-based enclosed-lens optical systems utilize the light bending and focusing effect of the microspheres to refract light onto a reflector member which is reflected and then refracted back toward its origin. The degree of refraction and thus the optimal placement of the specular reflector depends on the relative refractive indices of the cover layer above the microspheres, the microspheres, and the spacing layer between the microspheres and the reflector member, if any. For example, when used with cover layer and spacing layer materials having refractive index of approximately 1.5, a 2.25 refractive index microsphere will focus the light behind it at a distance of about 0.44 times its radius. The thickness of the spacing layer preferably approximates this so that light is focused onto the specular reflector. Any deviation away from these precise optical relationships will tend to result in losses of retroreflectivity of the base sheeting. Thus, the cover layer preferably remains firmly attached to the microsphere layer, the microspheres preferably are stably positioned in the matrix, and all layers through which light must pass to be retroreflected are preferably clear and distortion-free. In addition, the specular reflector, typically vapor deposited aluminum, preferably remains as a substantially continuous, distortion-free layer without cracking or corroding. The spacing layer-specular layer interface preferably remains smooth and wrinkle-free. Very small changes in these optical relationships will tend to result in degradation of the retroreflective performance of the base sheeting and thus of any article made using such base sheeting. Although extremely small changes may not cause objectionable brightness loss, slight changes can severely affect these precise relationships. It is surprising that any retroreflective sheeting made using these precise optical relationships can withstand repeated traffic impact and shear stresses in combination with other effects of sunlight, rain, road oil, road sand, road salt, and vehicle emissions.

When light enters embedded-lens retroreflective sheeting at high entrance angles and passes through a microsphere, it tends to be focused at the side of the microsphere rather than at the back as happens when light is incident in a more perpendicular fashion at low incidence angles. Therefore, it is important to maintain the right spacing between the microspheres and reflective layer. As will be understood by those skilled in the art, the thickness of the space coat layer can be controlled partly by fabrication methods. When the spacing layer tends to conform hemispherically, that is, concentricly to the back side of the microspheres, optimum spacing for a variety of entrance angles can be achieved. U.S. Pat. No. 4,505,967 (Bailey) discloses embedded-lens retroreflective sheeting suitable for use herein and discusses in detail the relationship between configuration of the spacing layer and retroreflective response of the sheeting. 3M SCOTCHLITE Brand Reflective License Plate Sheeting No. 3750 is an illustrative example of a commercial retroreflective sheeting that can be used in the invention.

It is important that the light-transmissive top film on top of the cover layer of the retroreflective base sheet, if any, be durable because the pavement marking will in some applications, be exposed to high volumes of traffic. The top film is preferably substantially continuous and of similar chemical family as the refracting elements so that the elements and covering may melt together to form a permanent bond. Alternatively, other compositions may be used as long as the elements adhere well to such compositions. The top film is preferably also resistant to dirt build-up, clear, flexible enough to conform to the road surface, has as little elastic force as possible, bonds to inorganic anti-skid particles, and does not appreciably change color during use.

III. Refracting Elements

In accordance with the present invention, there is an array of light refracting elements adhered to the cover layer of the base retroreflective sheeting. As used herein, array means a plurality of refracting elements, whether or not the elements are arranged in an ordered pattern or randomly. The elements are typically discrete. Except for some minimal overlap of elements that become merged during fabrication, the refracting elements typically adhere to the cover layer of the base sheeting substantially separately from one another. However, although discrete refracting elements are preferred, non-discrete elements may be used, e.g. the refracting elements may be connected by an underlying sheet. For example, a cover film can be made comprising a generally planar sheet with an array of appropriately shaped protrusions (i.e. refracting elements) on one side. This cover film can be made by any convenient method, such as extrusion embossing or by cast and cure processing. The cover film may be attached to the cover layer of the base sheeting. The elements may be either substantially uniform in size and shape or may be of varying size and shape. The elements may be arranged in an ordered pattern or may be arranged randomly.

The desired properties of the refractive elements include a high degree of clarity, and a glossy scratch-resistant surface. The clarity of the elements is important so that incident light is transmitted through the element with minimal loss such that a majority of that light will be retroreflected back to the source. The surface of the element is preferably scratch-resistant so that it will remain glossy, and light will not be scattered by scratches. The elements are preferably of sufficient hardness to resist the flattening effects of traffic, and should not soften appreciably at temperatures below 75° C. (170° F.). Preferably at least some of the elements have a Shore D Hardness of at least 45. In addition, the elements must not crack upon traffic impact at temperatures from −40° C. to 75° C. (−40° F. to 170° F.). The elements preferably also adhere well to the retroreflective base sheeting, and are preferably oil-resistant, dirt-resistant, and moisture-resistant. Other desirable or preferred properties of the elements include low color, low cost, low melting point, and low melt viscosity.

Refracting elements applied to the base retroreflective sheeting in accordance with the invention may be either glass, ceramic, or polymeric.

Illustrative examples of polymeric materials suitable for use as refractive elements include polycarbonates, acrylics, polyurethanes, polyvinyl chloride, and polyolefin copolymers, such as, polyethylene acid copolymer consisting of ethylene methacrylic acid (EMAA), ethylene acrylic acid (EAA), ionically crosslinked EMAA or EAA. A preferred material is an aliphatic polyurethane because of its high impact resistance, flexibility at low temperatures, color, clarity, abrasion resistance, and bond strength to preferred base sheeting cover layer.

Retroreflective base sheetings that would be damaged by the high temperatures involved in processing if the elements were to be formed directly thereon may instead be laminated to a sheet to which the elements have been previously attached. Alternatively, element compositions may be chosen with lower melt temperature characteristics such that they can be formed on and adhered to the cover layer without undesirably degrading it. In addition, non-melting systems such as curable liquid monomer compositions, for example, cured by e-beam or ultraviolet radiation, solvent evaporating compositions, moisture curable systems, and two component reactive systems, may be used if desired to form the refracting elements.

It will be understood that the refracting elements can be of any desired shape in horizontal cross section, that is, in the plane parallel with the surface of the pavement marking, e.g., such as ellipsoidal, semicircular, oblong, rectangular, irregular, regular, etc. In some embodiments where optimum retroreflective brightness from all orientations is desired (for example, a pavement marking for intersections), the horizontal cross section of the refracting elements is preferably substantially circular.

Typically a large portion of each refracting element, e.g., at least 75 percent, often at least 85 percent, and frequently substantially all of the element, will be exposed above the cover layer.

Figure 7:
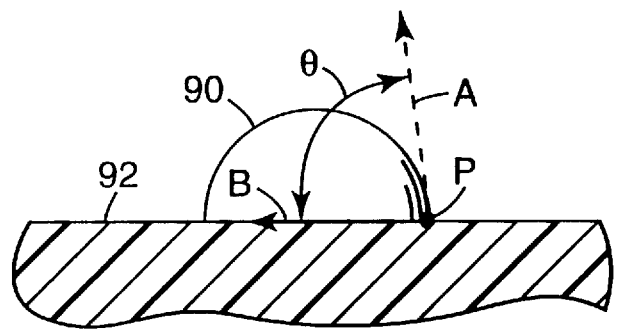
FIG. 7 is a vertical cross section of a portion of an illustrative retroreflective article of the invention showing a contact angle.

Typically it is preferred that the refracting elements are in the range of about 0.2 to about 6.0 millimeters in height, more preferably about 1 to about 4 millimeters, and in the range of 1 to 20 millimeters in diameter when rounded in horizontal cross section. Also, it is desirable to have the average width of the refracting element at the base equal to about 2 to 5 times the average height of the refracting elements. An ideal shape of the refracting elements is a hemisphere or some percentage thereof. The element preferably has a contact angle with the base sheeting of between about 45° and 135° and more preferably 60° to 110°. In such configurations, high incidence light is refracted by the front edge and enter the base sheeting. As used herein, "contact angle" refers to the angle formed by (1) a first ray having its endpoint where the refracting element meets the base sheet, the ray lying tangent to the surface of the refracting element at the endpoint and (2) a second ray having the same endpoint, lying in the same plane as the tangent line and in the same plane as the surface of the base sheet. As shown in FIG. 7, refracting element 90 makes a contact angle θ with the top surface of base sheet 92 at endpoint P as defined by first ray A and second ray B.

Another illustrative refracting element shape is a truncated pyramid. For example, an element that is about 1 millimeter high, has a flat top that is about 1 millimeter square, and has a base that is about 4 millimeters square, the top and base being aligned or centered with one another, such that the sides intersect the base about a 33.5° included angle (i.e. contact angle) would be well suited for use in the invention. Such elements will refract large portions of high entrance angle light into the base sheeting. In general, it is preferred that at least one side of the pyramid is straight in vertical cross section and makes a contact angle with the base sheet of between about 30° and 70°.

Refracting elements may also include a sharpened portion positioned so as to increase skid resistance. In some instances, the sharpened portion may be polymeric. If desired, it may be formed at the same time the refracting elements are formed. For example, a cover film comprising an array of refracting elements on top of a continuous sheet may be extruded that includes a sharpened portion on the elements. The sharpened portion may be anti-skid particle protruding from the element instead of a protrusion of the material constituting the element. Anti-skid particles could be embedded in the refracting elements. Preferably, the sharpened portion is located as near to the top surface of the refracting elements as possible to maximize skid resistance. However, the sharpened portion may be positioned any where on the surface of the refracting elements as long as it increases skid resistance.

The vertical cross section shape of the refracting elements, that is, a cross-section in a plane perpendicular to the surface of the base sheet, should include at least one side (referred to as the front side) that is sloped sufficiently that the element will refract high entrance angle light into the retroreflective base sheet. However, refracting elements with very shallow slopes, that is, those that have a contact angle of less than 10°, should be avoided. These shallow slopes tend to reflect light specularly away from the refracting elements. Typically, the elements will have a rounded profile in vertical cross section.

Figure 5:
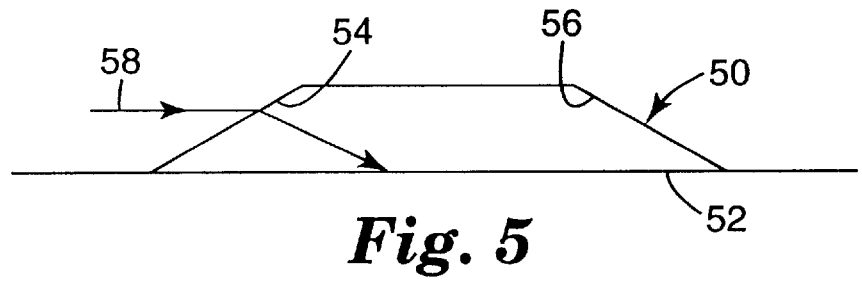
FIG. 5 is a vertical cross section of another illustrative refracting element in accordance with the invention.

In some embodiments such as shown in FIG. 5, the refracting elements may have straight edges in their vertical cross section. Refracting element 50 on base sheeting 52 has straight front side 54 and straight back side 56. Light 58 incident to front side 54 is refracted by side 54 to enter base sheeting 52 so as to be retroreflected. Unlike the elements disclosed in U.S. Pat. Nos. 4,145,112 (Crone) and 4,236,788 (Wyckoff), the front and back sides of the element do not need to be oriented precisely to one another to achieve retroreflection. In addition, unlike the reflectively functioning light directing elements disclosed in those references, the light refracting elements in articles of the invention may be formed from relatively flexible, less rigid materials, thereby achieving greater product durability. The elements disclosed in those patents require the second face of the element to be oriented in conjunction with the first face and of such quality to reflect light into the base sheeting. In contrast, the refracting elements of the invention rely upon refraction, typically at a single (i.e., the front) face. This eliminates the need to configure the first and second faces to achieve reflection off the second face, and also eliminates the need for the second face to be of a quality capable of reflection, for example, polished. The quality necessary for reflection is typically more stringent than that required for refraction. Finally, the articles disclosed in these references are not known to have utilized base sheets that were capable of retroreflection of high incidence angle light such as are preferred for use in the present invention.

Preferably the shape of light refracting elements is such that a major portion of light incident the article at between about 70° and 90° is refracted so as to enter the retroreflective base sheet. In accordance with the invention, the retroreflective brightness of an article of the invention at entrance angles above 89°, and typically above 85°, is higher than the retroreflective brightness of the base sheet alone.

The spacing between refracting elements may be uniform, or the elements may be arranged in a random manner. A less than optimum spacing of the elements may be used in those applications where optimum brightness is not required. This feature of random refracting element placement permits simplified, less expensive manufacturing. However, in the present invention, uniform placement in a specific pattern can be advantageous because the elements may be placed in specific locations in such relation to one another that each element does not shadow other elements. In this manner, the majority of the incident light will be captured by the elements so as to optimize the retroreflective brightness at pavement marking geometries. For instance, refracting elements may be spaced apart so as to minimize shadowing of adjacent elements at anticipated entrance angles and to permit greater surface contact of vehicle tires with the spaces between light refracting elements which may contain protruding skid control particles. Preferably, the surface area occupied by the refracting elements is less than fifty percent of the base sheet in order to allow for maximum conformance of the inventive article, e.g., to the road, a guard rail, or other structure. More preferably, the surface area covered by the refracting elements is less than twenty-five percent.

The inventive article, including the refracting elements, can be protected by using a protective coating. Such a coating has the advantages of providing abrasion and/or dirt resitance. Illustrative examples of of a protective coating include, but are not limited to, ceramer coatings or crosslinked water-based polyurethane coatings.

As used herein, "ceramer" refers to a fluid comprising surface-modified colloidal silica particles dispersed in a free-radically polymerizable organic liquid. Advantages of the coating include the ability to withstand outdoor conditions with excellent resistance to moisture, light and heat; resistance to abrasion; resistance to chemical attack and coloration by automobile engine oil and carbon black (for example, carbon black of tires); desirable optical properties such as transparency; good adhesion to the refracting elements; and good flexibility. In a first step, a ceramer precursor coating composition is applied to the surface of retroreflective article, preferably including the top surface of the refracting elements and portions of the base sheet not covered by refracting elements. The coating composition comprises about 20 weight percent (wt %) to about 80 wt % of ethylenically unsaturated monomers; about 10 wt % to about 50 wt % of acrylate functionalized colloidal silica; and about 5 wt % to about 40 wt % of N,N-disubstituted acrylamide monomer or N-substituted-N-vinyl-amide monomer; wherein said percentages are weight percents of the total weight of said coating. The composition is then cured to form a retroreflective article having an abrasion-resistant, light transmissive ceramer coating. The ceramer composition can be applied by any of a number of methods known in the art, including spraying, rolling, dip coating, or knife coating. Assignee's pending U.S. patent application Ser. No. 08/444,076 (filed May 19, 1995 incorporated herein by reference in its entirety) discloses the use of a ceramer on pavement markers and retroreflective sheetings.

An illustrative example of a crosslinked water-based polyurethane protective coating suitable for use in the invention comprises NEOREZ R-960 Brand polyurethane resin crosslinked with CX100 Brand crosslinking agent (both available from Zeneca Resins, Wilmington, Mass.). As will be understood by those skilled in the art, other water-based systems and crosslinking agents may be used in formulating a protective coating.

IV. Methods of Manufacture

The method of the invention comprises: (1) providing a retroreflective base sheet comprising an array of reflective elements and a cover layer and (2) adhering or forming an array of refracting elements on the cover layer, the refracting elements being disposed relative to the base sheet such that light incident to the array at a high entrance angle is refracted so as to be transmitted into the base sheet, retroreflected by the base sheet, and further refracted by the refracting elements so as to be retroreflected by said article.

In a typical fabrication process to make a pavement marking, a base sheet (for example, 3M SCOTCHLITE Brand Reflective License Plate Sheeting No. 3750), would be applied to an aluminum conformance layer. Subsequently, refracting elements would be adhered to the cover layer of the base sheet.

Several methods may be used to adhere the refracting elements to the base sheet. For instance, where the refracting elements are pre-formed they can be simply individually bonded to the front surface of the cover layer of the base sheet, for example, through lamination under heat and pressure, with adhesive, etc. Alternatively, an array of refracting elements can be formed as protrusions on an overlay with a top film to yield a cover film by using, for example, an extrusion embossing process. This cover film can be laminated to the cover layer of the base sheet.

In some instances, such as where the refracting elements are made of thermoplastic resin, suitably sized resin particles are applied to the front surface of the cover layer by, for example, sprinkling, scattering, etc. Subsequently, sufficient heat is applied for a sufficient time to cause the resin particles to deform and flow into a rounded shape and bond to the cover layer. In such instances, the cover layer and refracting elements are such that a good bond develops therebetween when heat is applied. Typically it is preferred that they be thermoplastics of similar polymer family. If desired, the cover layer could comprise a top film chosen to be of a similar polymer family as that of the thermoplastic resin particles.

In the fabrication process, it is typical to add anti-skid particles, if used, at the same time the refracting elements are attached to the base sheet. Also, colorants, e.g., dyes and/or pigments, may be introduced at an appropriate time during the fabrication process, depending on where in the article a colorant is desired.

Components of the inventive article that lie underneath the retroreflective base sheet are preferably selected to fit the application desired. For example, a scrim adhesive (i.e., a polymeric scrim that has been saturated with an adhesive) imparts additional strength as well as selected adhesive characteristics to the retroreflective article. Suitable conformance layers, adhesive layers, reinforcing layers, etc. can be readily selected by those skilled in the art.

The final shape of polymer refracting elements will vary depending on (1) the processing conditions, (2) the original shapes of the elements, (3) the melting characteristics of the polymer, and (4) the cover layer of the base retroreflective sheeting. The refracting elements may be randomly shaped or relatively uniform depending on their initial shape and subsequent processing conditions.

Figure 6:
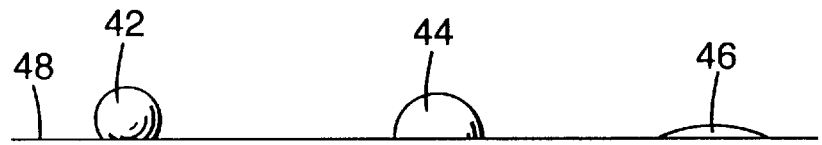
FIG. 6 is a vertical cross sections of illustrative refracting elements in accordance with the invention.

FIG. 6 depicts the vertical cross sectional profile of three refracting elements 42, 44, and 46 on top or front major surface 48 of the cover layer of the retroreflective base sheet in accordance with the invention. Refracting elements of the invention, whether glass, ceramic, or polymeric, are not spheres but are instead a portion thereof. The portion of element 42 above surface 48 is nearly a complete sphere. For example, element 42 is a refracting element partially embedded in the cover layer of the base sheet or a partially melted thermoplastic resin. Element 44 is hemispherical; that is, it is a refracting element more deeply embedded in the cover layer of the base sheet or a more greatly melted thermoplastic resin. Element 46 is relatively flat; that is, it is a thermoplastic material that was heated an excessive period of time.

Preferably the contact angle formed between the edge of the refracting element and top surface of the base sheet underneath the base of the refracting element is between about 60° and 110°. Elements which touch the base sheet at larger contact angles present interstices that are more likely to retain deposits of dirt which may reduce optical performance. Larger contact angles also cause refracting elements to be bonded less securely to the base sheet. However, refracting elements which contact the base sheet at smaller contact angles will tend to specularly reflect incident light rather than refract it into the base sheet so as to be retroreflected. Furthermore, refracting elements with smaller contact angles tend to have lower vertical height which reduces its light gathering capabilities.

Refracting elements of the articles of the invention typically preferably have a vertical cross section profile like that of element 44, i.e., substantially a hemisphere. The shape of the refracting elements is preferably such that a major portion of incident light is refracted to enter the base sheet.

Elements with vertical cross section profiles like that of element 42 tend to be more subject to collection of dirt and debris resulting in reduced retroreflective brightness. Also, such rounded elements may be more subject to pop off from the base retroreflective sheeting since less surface area of the refracting element is in contact with the base sheeting. Refracting elements like element 42 are formed by use of relatively short oven times and/or relatively low oven temperatures such that thermoplastic elements do not flow and flatten as much. It will be appreciated, however, that retroreflective articles of the invention with refracting elements having such shapes may be satisfactory for vertical applications, e.g., the sides of traffic barriers, where impacts are not likely (as compared to pavement markings which are driven over) and where rain will tend to provide cleaning action.

Element 46 illustrates a thermoplastic element that has been heated for longer and/or at higher temperature, making the element more flattened. Such flattened elements will adhere to the retroreflective base sheeting more strongly than a more rounded element, but depending upon the vertical profile of the front edge, may be less refractive so as to render the resultant article less retroreflective at high entrance angles. The more rounded elements, for example like element 44, result in higher retroreflectivity because the light is refracted to a greater degree. There is a higher projected area to capture incident light, and typically there is less incident light scattered or reflected off the face.

If polymer elements are applied in a random fashion and subsequently heated, some elements may flow together upon heating. Although the resulting element has lower reflectivity than two individual elements, there is generally still significant reflectivity from this now ellipsoidal element. Maximum reflectivity from an ellipsoid element will be obtained if the element is oriented transversely to road traffic.

V. Colorants

Numerous methods may be used to add colorants to selected portions or the entirety of the retroreflective article. In pavement marking applications, illustrative examples of desirable colorants include, among others, white, yellow, red, and blue colors. The colorants may be light transmissive or opaque, as desired.

Typically, if the colorant is disposed within the optical path it is preferably light transmissive such that retroreflective performance is not undesirably reduced. However, it will be appreciated that in some instances it may be desirable to use an opaque colorant disposed in a location that will reduce retroreflective brightness while providing some other desired effect, e.g., more brilliant overall color or appearance.

Light transmissive colorants can enhance both day time and night time color of the inventive article. In pavement marking applications, as well as others, it is important that a motorist distinguish between colored markers, for example between yellow and white markings. One way to obtain night time color involves placing a light transmissive colored material in the optical path.

In one approach, color is achieved using a colored base sheeting. For example, in FIG. 4, light trasmissive matrix 65 can be made with the desired color, for example yellow. In a encapsulated-lens cube-corner type base sheeting, the cube-corners themselves may be colored. Another approach is to use a colored top film, if needed. For example, inventive article can be made with a light transmissive yellow, red, or blue colored top film. Also, colored refracting elements may be used. When a light transmissive colored top film is used in conjunction with a light transmissive colored refracting elements, a very effective colored retroreflective article results. Alternatively, a light transmissive colored layer can be printed onto the cover layer of the base sheeting. A colorless top film could be applied on top of the printed base sheet. This approach has the advantage of burying the colored layer to enhance its durability. Also, printing allows for the addition of multiple color layers in a pattern to form desired symbols or legends.

Opaque colorants are typically used mainly to enhance the day time color of the inventive article and preferably lie outside the optical path so as not to reduce retroreflective performance. Thus, a base sheeting that is gray colored initially, due to the aluminum reflective layer, can be changed to a desired color by the addition of an opaque colorant. For example, one approach to make a whiter article would entail using white, opaque segments on the cover of the base sheet with the light refracting elements. Although these particular segments will not retroreflect incident light, they will increase the whiteness of the sheeting when used in small quantities. For example, pellets of white pigmented resin (perhaps the same resin used in the light refracting elements) might be applied to the top of the base sheet between light refracting elements and heated so as to cause them to melt and adhere to the base sheet.

Alternatively, colored segments of desired color could be applied to some portions of the light refracting elements as well as to the base sheet, albeit at some reduction in retroreflective response. For example, a method for making a colored retroreflective article comprise of the following steps: (1) providing a retroreflective base sheet comprising an array of retroreflective elements and a cover layer, (2) laminating a conformance layer to the bottom of the base sheet, (3) adhering an array of refracting elements on the cover layer of the base sheet, (4) debossing the refracting elements to yield a relatively flat top surface, (5) applying a colored layer onto the top surface, and (6) embossing the base sheet so that the refracting elements protrude from the base sheet.

"Debossing" refers to reverse embossing; i.e., to make a textured surface be relatively flat. As used herein, refracting elements that originally protrude from the top surface of the base sheet are pushed down so that they become relatively level with the base sheet. One way to deboss involves feeding the base sheet with its attached conformance layer and refracting elements through a set of rollers. For instance, the refracting elements would contact a steel roll while the conformance layer would contact a rubber roll that can deform under lamination pressure. Pressure is applied to push the refracting elements down into the conformance layer. After debossing, it is not necessary for the top surface of the sheeting to be perfectly smooth. Some surface topography is allowed. Preferably, the resultant surface of the base sheeting is as nearly flush with the refracting elements as possible. After debossing, a colored layer is applied to portions of the base sheet, portions of the refracting elements, and to the anti-skid particles, if any, by any convenient technique.

An opaque colored layer may also be transferred onto selected portions of the base sheet before adding refracting elements thereto. For example, a method for making a colored retroreflective article comprise the following steps: (1) providing a retroreflective base comprising an array of reflective elements and a thermoplastic cover layer, (2) providing a discontinuous thermoset polymer on the cover layer in a regular pattern to yield a partially printed base sheet, (3) heating the partially printed base sheet to soften the cover layer, (4) depositing refracting elements onto the partially printed base sheet while the cover layer is softened and such that the refracting elements can selectively adhere thereto, (5) melting the refracting elements, and (6) cooling. Portions of the thermoset polymer may contain a colorant as desired. For example, in one embodiment, all area of the base sheeting could be printed with a thermoset colored layer except for the regions beneath the refracting elements, i.e., where they are bonded to the cover sheet. In another embodiment, a light transmissive thermoset polymer could be printed to encircle the refracting elements at a defined radius. The balance of the sheeting could be printed with another colored thermoset polymer, for example white. The regions immediately beneath the refracting elements would be unprinted. Because it is possible for a light ray to enter the base sheeting outside the base of the refracting elements, the region of light transmissive polymer encircling the refracting elements would still allow the light ray to enter the base sheeting and be retroreflected by the base sheeting. This same method has the advantage of placing the refracting elements in an ordered fashion thereby increasing the optical efficiency of the article while minimizing the amount of refracting elements used for cost effectiveness.

The composition of the colored layer, if any, should be resistant to solvents, traffic wear, and ultraviolet light. An example of a colorant solution comprises 78 wt % NEOREZ R960 Brand water-based urethane resin (from Zeneca Resins, Wilmington, Mass.), 19 wt % WW3000 Brand titanium dioxide dispersion (from Heucotech Ltd., Fairless Hills, Pa.) and 3 wt % CX100 crosslinker (from Zeneca Resins, Wilmington, Mass.). It will be obvious to those skilled in the art that other colored layer compositions may be used.

It will be obvious for one skilled in the art to use a combination of opaque and light transmissive colorants. For example, light transmissive colored refracting elements lying in the optical path could be used with an opaque colored layer lying outside the optical path. In this way, an article would be have effective day and night time colors. Thus, any of the above combinations of opaque and light transmissive colored systems could be used.

VI. Anti-Skid Particles

Anti-skid particles are a common component of many pavement marking articles to increase the skid resistance of the pavement marker and have been used extensively in the art. They can be placed anywhere on the surface of the article where there is contact with the tires of the vehicles.

Typically, anti-skid particles can be randomly sprinkled on to the cover film of the base sheet while it is in a softened state. They also can be placed deliberately on refracting elements as a sharpened portion. It has been found that anti-skid particles can be preferentially deposited close to the zenith of the refracting elements. For example, a web of base sheeting with the refracting elements thereon could be kiss-coated with a binder composition. Kiss-coating refers to a coating method where a composition is desirably coated to only the top portions of the refracting elements; i.e., the solution is allowed to "kiss" the tops of the refracting elements only. This process is done by controlling the gaps between the coating rolls and maintaining the web such that only the tops of the refracting elements are allowed to touch the coating composition. As the composition remains wet, copious amounts of anti-skid particles are sprinkled on to the web. Because the rest of the base sheeting is dry, the particles adhere only to the wet areas. Excess anti-skids particles are vibrated off the web. Subsequently the web is sent through a series of ovens to dry, cure, or solidify the wet binder composition. As a result, the anti-skid particles are selectively secured to the top regions of the refracting elements thereby providing anti-skid resistance.

VII. Applications

Retroreflective articles of the present invention may be used advantageously in a number of different applications, particularly where light is incident at high entrance angles. In particular, the articles are well suited for use as pavement markings or horizontal signs. Because of their high retroreflectivity at both high and low entrance angles, the articles are also well-suited for vertical applications, such as use on Jersey barricades or guard rails; for curved surfaces applications such as traffic barrels, tubes, and cones; for vehicle surfaces; and for other applications where the exceptional effective entrance angularity of the article will be advantageous. For example, because many embodiments of sheeting of the invention can provide effective retroreflection over all entrance angles from 0° to nearly 90°. As a result, when the sheeting is wrapped around an object such as a telephone pole or barrel, the entire surface of the sheeting that is within the line of sight can provide effective retroreflection including portions on the surface of the article that are curving away from the observer. This increases the effective retroreflective area, providing a more visible marking and thereby enhancing safety. In addition, a single marking such as a stripe on a guard rail, Jersey barrier, or wall that is parallel a first road and perpendicular to a second road that intersects the first road on the opposite side of the first road from the second road can provide very bright and effective retroreflective response visible to drivers of vehicles on both the first and second roads.

Another advantage of the present invention is that because the retroreflective article is visible from many orientations. This omni-directional feature makes the invention particularly well suited for horizontal signing applications, intersection markings, etc. where vehicles may approach from a number of angles.

The ease of coloring this sheeting also makes it particularly useful for horizontal signs. Transparent color layers may be printed onto the sheeting in a graphic pattern so that the retroreflected light has nearly the same coloration and pattern as is seen in a daytime viewing. Such printing is especially useful if the ink is printed beneath the top film layer so as to be protected from road abrasion by both the elements and the continuous overlying transparent solid covering. This feature is particularly important as commonly used inks are thin, and can thus be quickly worn away by road traffic if left exposed.

Material of the invention may be wound upon itself into a roll form. The projections made by the elements are not substantial enough to interfere with wind-up.

VIII. Examples

The invention will be further explained by the following illustrative examples which are intended to be non-limiting.

Wet Retroreflectivity

The wet retroreflectivity of the reflective sheetings was measured using a LTL 2000 (available from Delta Light & Optics, Lyngly, Denmark) which measures retroreflective brightness at a 88.760 entrance angle and a 1.05° observation angle. Such a configuration is similar to that which would be experienced by a driver of an average automobile 30 meters away from the reflective pavement marking. The sheeting was first laid horizontally in the test area and then flooded with a solution of tap water and 0.1 weight percent AJAX Brand dishwashing soap. The solution was allowed to run off, and brightness measurements taken within about 10 seconds. Soap is added to the water to increase surface wettability of the sheeting. The soap also better simulates the effect of rain after the reflective pavement marking has been on the road for some time, when it has been subjected to increased wettability due to the actions of sun, abrasive grit and sand, and dirt accumulations.

Retroreflective Brightness Measurement

Retroreflective brightness measurements of some samples were made according to ASTM D 4061-94. Intrinsic geometry as described in ASTM E 808-94 was used. Presentation angle was kept constant at 0 degrees; the orientation angle was maintained at −180 degrees.

The retroreflective brightness of some samples, in millicandela/meter$^2$/lux, i.e., the coefficient of retroreflective luminance, $R_L$, was measured at entrance angles and observation angles corresponding to four different observation distances for the driver of a 1989 Pontiac Bonneville automobile as follows:

| Distance | Entrance | Observation |
| --- | --- | --- |
| 30 m | 88.5° | 1.0° |
| 50 m | 89.3° | 0.60 |
| 80 m | 89.6° | 0.40 |
| 120 m | 89.7° | 0.25° |

Color Measurements

CAP Y is a colormetric measurement of the sheeting's whiteness. CAP Y values were measured using a Hunter Spectrophotometer (Hunter MiniScan XE) according to ASTM E 97-77.

Skid Resistance Measurements

Skid resistance is a measure of a tire's tendency to slide on the sheeting. This skid resistance is measured according to ASTM E 303.

Example 1

MORTHANE Brand PN3429-215, an aliphatic polyester thermoplastic polyurethane, (available from Morton International, Seabrook, N.H.) was extruded onto a polyethylene terephthalate (PET) carrier using a single screw extruder and a film die under standard extrusion conditions. This extrusion yielded a 50 micron (2 mil) thick urethane film top film.

A prime solution containing Q-THANE Brand QI 4820 (available from K. J. Quinn & Company, Inc.) was thinned to about 200 cps with a tolune-butanol mixture (50/50 weight percent). The thinned prime solution was coated onto the top surface of a high angularity base sheeting, 3M SCOTCHLITE Brand Reflective License Plate Sheeting No. 3750 (available from 3M Company, St. Paul, Minn.) using common gravure coating techniques with a 150 line quadrangular gravure roll . The sheeting came on a silicone paper liner. The solution was dried through a series of ovens heated from 66° C. to 121° C. (150° F. to 250° F.) at a speed of about 9.1 meters/min. (30 feet/min.).

Using a heated hot can and a rubber coated pressure roll, the polyurethane film with its PET carrier was laminated to the primed surface of the high angularity base sheeting. The pressure roll operated at 6.1 meters/min. (20 feet/min.), at a pressure of 19 kg/cm of width, and a temperature of 150° C. (300° F.).

The PET carrier was then stripped away from the polyurethane film. The silicone paper liner was stripped from the high angularity base sheeting leaving exposed adhesive. A 75 micron (3 mil) thick No. 1145-0 single rolled aluminum foil (available from A. J. Oster Foils, Inc.) conformance layer was laminated to the exposed adhesive to yield a composite sheeting.

This composite sheeting was placed, with foil side down, into a 225° C. (440° F.) convection oven with circulating air. After 15 seconds, the oven was opened and MORTHANE Brand L425.91 pellets, a thermoplastic polyurethane (available from Morton), were sprinkled onto the surface of the sheeting. The oven was then closed again, and the sheeting with pellets were allowed to heat for an additional 5 minutes. The pellet coated sheeting was removed from the oven and cooled at room temperature for approximately 1 minute.

The thermoplastic pellets, which were of approximately uniform size, were randomly applied to the composite sheeting. The pellets were applied sparsely so as to minimize shadowing of one pellet by another, but densely enough to result in strong retroreflective properties. The coating weight of the pellets was about 300 grams per square meter of sheeting, or approximately 13,000 pellets per square meter of sheeting. The pellets were initially ellipsoidal in shape, with major and minor axes of about 4.5 mm and 3 mm respectively. As heating proceeded, the bottom surface of the pellets flattened. The exposed portions of the pellet became rounded or spherical. The resultant refracting elements were about 4.5 mm high and about 5 mm wide at the base.

The foil side of this composite sheeting was then laminated to a rubber-based pressure-sensitive adhesive suitable for adhesion to asphalt and concrete to yield a retroreflective article. The retroreflective article was laminated to an aluminum test panel for retroreflective analysis.

Table 1 compares the retroreflective performance at all entrance angles of the 3M SCOTCHLITE Brand Reflective License Plate Sheeting No. 3750 before any processing and after the resultant example was made according to the above description. The brightness measurements were taken at an observation angle of 1.0°. Brightness is reported as millicandela/meter$^2$/lux, i.e., the coefficient of retroreflective luminance, $R_L$.

TABLE 1

Retroreflective Brightness Measurements Taken
at 1.0° Observation Angle According to ASTM D-4061-94

| Entrance Angle | Base Sheeting (mcd/m$^2$/lux) | Inventive Article (mcd/m$^2$/lux) |
| --- | --- | --- |
| −4 | 9749 | 10363 |
| 10 | 9689 | 10245 |
| 20 | 9479 | 10024 |
| 30 | 9433 | 10038 |
| 40 | 9997 | 10715 |
| 45 | 9978 | 10721 |
| 50 | 9299 | 9980 |
| 55 | 8676 | 9204 |
| 60 | 9308 | 8562 |
| 65 | 8141 | 7998 |
| 70 | 7643 | 7104 |
| 75 | 6205 | 5502 |
| 80 | 3615 | 3239 |
| 85 | 981 | 1536 |
| 88.5 | 137 | 1840 |

As Table 1 indicates, the brightness of the inventive article at low entrance angles has not been comprised. In fact, the brightness of the inventive article at lower entrance angles (below about 50°) has not been reduced. Significantly, brightness at very high entrance angles of about 88.5° increased by at least ten fold.

Example 1B

A pavement marking material was made as in Example 1 except 94 grams per square meter of the pellets were used to yield about 4000 refracting elements per square meter.

Example 2

A thermoplastic polyethylene methacrylic acid copolymer (EMAA) resin (NUCREL Brand 699 from DuPont) was extrusion coated at an approximate 50 micrometer thickness onto a PET carrier using a single screw extruder. The coating die and extrusion conditions were similar to those suggested by DuPont for extruding this particular resin. The resulting film on the PET carrier was hot laminated to the front face of a high angularity base sheeting (3M SCOTCHLITE Brand Reflective License Plate Sheeting No. 3750, "the 3750 Sheeting") after the top surface (the side away from the silicone protective liner) of this sheeting had been primed with ADCOTE Brand 50T4983, a waterborne EAA (polyethylene acrylic acid) available from Morton Chemical Co. Twenty parts ethyl alcohol were added per 100 parts of the ADCOTE Brand 50T4983. This solution was applied to the surface of the 3750 sheeting by common gravure coating techniques, using a 150 line quadrangular gravure pattern, and then dried in a forced air convention oven for one minute at 93° C. (200° F.). The 50 micrometer (2 mil) thick EMAA film held on the PET carrier was hot laminated to the primed side of the 3750 sheeting using the same lamination conditions as in Example 1. The PET carrier was stripped away, and the composite laminated to 75 microns (3 mil) aluminum foil (No. 1145-O single rolled aluminum foil available from A. J. Oster Foils, Inc.) as in Example 1.

After preheating the resulting sheeting for 15 seconds in a 205° C. (400° F.) oven, the sheeting was sprinkled with NUCREL Brand 699 pellets (the same material used previously to make the top film). This sheeting with the NUCREL Brand pellets remained in the closed 205° C. (400° F.) oven for various amounts of time before removal and cooling in water for one minute.

Example 2A

After the NUCREL Brand 699 pellets were sprinkled onto the preheated composite sheeting, it was left in the oven at 205° C. (400° F.) for about 45 seconds. The resulting refracting element had a shape similar to element 42 of FIG. 6. The composite sheeting was laminated to a pressure sensitive adhesive as in Example 1 to yield the retroreflective article.

Example 2B

After the NUCREL Brand 699 pellets were sprinkled onto the preheated composite sheeting, it was left in the oven at 205° C. (400° F.) for about 60 seconds. The resulting refracting element had a shape similar to element 44 of FIG. 6. The composite sheeting was laminated to a pressure sensitive adhesive as in Example 1 to yield the retroreflective article.

Example 2C

After the NUCREL Brand 699 pellets were sprinkled onto the preheated composite sheeting, it was left in the oven at 205° C. (400° F.) for about 90 seconds. The resulting refracting element had a shape similar to element 46 of FIG. 6. The composite sheeting was laminated to a pressure sensitive adhesive as in Example 1 to yield the retroreflective article.

Example 3

The extruded film and carrier of this example were the same as in Example 1, except that the extrusion conditions (screw revolutions per minute and film take-away speed) were adjusted to yield a 250 micrometer thick polyurethane film on the PET carrier. The lamination of the polyurethane film to the base retroreflective sheeting, the removal of the PET carrier, and the lamination to the 75 microns (3 mil) aluminum foil were all the same as in Example 1. After lamination to the aluminum foil, the composite foil backed sheeting was placed in a heated hydraulic press over a mold with a 12 micron (0.5 mil) silicone-coated PET film against the mold (silicone PET films are available from Courtalds), the polyurethane side of the composite sheeting against the silicone PET, and a flat backup steel plate 3 millimeters approximately (0.125 inch) thick against the foil side of the composite sheeting. The hydraulic press was closed under a pressure of 41,300 kPa (6000 PSI) and the mold heated to a temperature of 190° C. (370° F.). The mold was then cooled to 52° C. (125° F.) before removal from the press. The PET was removed and discarded. The mold in the press had a ribbed pattern similar to that shown in U.S. Pat. No. 4,145,112, FIG. 2. However, the actual molded shape was more similar to that of FIG. 5 herein due to the stiffness of the PET. Lastly, the ribbed, foil-backed composite sheeting was laminated to a rubber-based pressure sensitive adhesive.

Example 4

The method of construction of Example 4 was the same as in Example 2 except that the EMAA top film thickness was 250 micrometers instead of 50 micrometers, and the polymer pellets used were SURLYN Brand 9910 (an ionomer of polyethylene methacrylic acid and zinc salt available from DuPont). The sheeting with the SURLYN Brand pellets was heated in a 250° C. (480° F.) oven for 5 minutes, resulting in a shape similar to figure element 44 of FIG. 4. The pellets tended to remain fairly spherical because of the high melt viscosity of the SURLYN Brand resin; however, the thicker top layer tended to crawl up the sides of the SURLYN Brand pellet due to capillary action, resulting in good anchorage to these spherically shaped pellets.

The wet retroreflective brightness in millicandela/lux/meter$^2$, measured as described above, for the examples was as follows:

TABLE 2

Wet Retroreflectivity Measurements using LTL 2000

| Example No. | Retroreflective Brightness |
| --- | --- |
| 1 | 2300 |
| 1B | 1100 |
| 2A | 1700 |
| 2B | 1600 |
| 2C | 1400 |
| 3 | Not Tested |
| 4 | 2200 |

In comparison, three commercial pavement marking tapes, 3M SCOTCH-LANE Brand Removable Pavement Marking Tape 620, 3M SCOTCH-LANE Brand Removable Pavement Marking Tape No. 5710, and 3M STAMARK Brand High Performance Pavement Marking Tape 380, all had wet retroreflective brightness of below 100 millicandela/lux/meter$^2$.

Example 5

A retroreflective article was made using the following steps:

A) Preparation of Polymer Pellets

Granular aliphatic polyurethane L425.91 which had a melt index of 12 (tested according to ASTM D1238 Method A, Condition 200/8.7) was fed through a 34 millimeters (mm) twin screw extruder at a rate of 13.6 kilograms/hr using a co-rotational mode of operation and a screw speed of 450 revolutions per minute (RPM). The polymer was melted and extruded through a two hole strand die and immediately quenched in a water bath. The excess water was blown off and the strands cut using a Conair model 304 pelletizer. Pelletizer speed was adjusted to yield approximately cylindrical pellets that averaged 2.74 mm long and 2.36 mm in diameter. Pellets were allowed to age at room temperature for 1 week before they were put into a high intensity mixer (Waring blender model 91-263) to break apart agglomerations of pellets that might have formed into individual free flowing pellets. After extruding, the pellets were again tested for melt index using the same test method and condition and found to be approximately 60 melt index. These pellets were used to make the top film and the refracting elements.

B) Extrusion of Top Film

The pellets made above (in section A) were dried in a dehumidifying drier for 18 hours at 54° C. They were then extruded through a 31.75 mm 24:1 single screw extruder using a screw speed of 80 RPM and the melt fed through a flex lip film die and extrusion coated onto a 0.06 millimeter polyethylene terephthalate (PET) film using common extrusion coating techniques. The take away speed of the casting wheel was adjusted to yield a film which was edge trimmed to a 0.317 meter width and had a coating thickness of approximately 0.1 mm. The film was rolled up for use later.

C) Preparation of Base Retroreflective Sheeting and Conformance Layer

3M SCOTCHLITE Brand Reflective License Plate sheeting No. 3750 (referred as "3750 sheeting", available from 3M, St. Paul. Minn.) was primed using an aliphatic polyurethane solution (QC 4820 from K. J. Quinn & Co.). The QC 4820 solution was first thinned using a 50/50 mixture of isopropanol and toluene to a viscosity of approximately 200 cps. This thinned solution was then applied to the top surface of the 3750 sheeting using a 150 line quadrangular gravure cylinder using common gravure coating techniques, and was dried through a series of 5 ovens with each oven about 7.6 meters in length and oven temperatures of 65/79/93/107/121 (all °C.) and a running speed of 30.5 meters per minute to yield a primed sheeting which was rolled up for storage. The 3750 sheeting was supplied with an adhesive and protective liner.

Then primed 3750 sheeting was combined with the top film made in section B above using a hot lamination operation, which is as follows: the top film was unwound and passed over a 0.61 meter diameter hot can (with the PET side of the film against the hot can) that had a surface temperature of 149° C. The top film was left on the hot can for about one-fourth of the circumference of the roll before it was laminated to the primed surface of the 3750 sheeting.

The lamination happened between the hot can a 0.2 meter diameter rubber covered pressure roll with a pressure of 1300 kilograms. The hardness of the rubber roll was measured at 55 shore A. The hot can and pressure roll each had a width of 0.46 meters. The primed 3750 sheeting was 0.311 meters wide while the top film was 0.317 meters wide. All rolls were turned at about 9.1 meters per minute surface speed. The combined sheeting was left on the hot can for one-half of the can's circumference. Subsequently, it was removed from the hot can and passed over a water cooled roller. The PET from the top film was stripped off in line while processing to yield a retroreflective base sheeting which was wound up for storage.

The base sheeting (top film laminated to primed 3750 sheeting) was unwound and laminated to 0.076 mm thick aluminum foil conformance layer (No. 1145-0 single rolled aluminum foil available from A. J. Oster Foils Inc.) using the same hot can and pressure roller equipment above except that the unit was operated at room temperature. First, the backside protective liner of the 3750 sheeting was removed thereby exposing the pressure sensitive adhesive. Then, the base sheeting was laminated to the aluminum foil using the pressure roller.

D) Application of Anti-skid Particles and Refracting Elements

The base sheeting on aluminum foil made in section C above was unwound and passed through the same series of 5 ovens used for priming the 3750 sheeting in section C above. The oven temperatures were set to 232/232/232/232 (all °C.) and the web speed was set at 12.2 meters per minute. The fifth oven was turned off. After passing through the first oven, the web entered an area between the first and second ovens where ceramic anti-skid particles were sprinkled onto the heated web at a rate of 16.7 grams/meter$^2$. Because the web was hot and the top film was soft, the anti-skid particles were tacked lightly to the surface. The web then immediately entered the remaining ovens where it was heated. The result was that the anti-skid particles became more firmly attached to the softened top film by actions of gravity and capillary forces to yield an anti-skid coated base sheeting. The fifth zone was deliberately turned off to give the web time to cool before winding up for storage.

The anti-skid coated base sheeting was unwound and subsequently processed through same series of ovens. Here, the oven temperatures were set at 210/210/210/210 (all °C.) at a speed of 13.7 meters per minute. The fifth zone was turned off. After the web passed through the first oven, it again entered an area between the first and second ovens where the urethane pellets made in section A were sprinkled onto the web. The pellets were applied at 138 grams/meter$^2$ and were partially tacked to the surface of the hot sheeting. Again the web immediately entered the second and subsequent ovens where they were heated and softened to form refracting elements that had approximately a hemispherical shape similar to refracting element 44 in FIG. 6. The web was cooled in oven zone 5 before windup. Finally, a rubber based pressure sensitive adhesive was applied to the aluminum conformance layer to yield a retroreflective article. These articles were applied to road surfaces and found to have excellent retroreflection during both dry and wet (rainy) conditions.

Example 5A

The sheeting was made according to Example 5 except the application of pellets and forming into refracting elements was done at web speed of 9.1 meters per minute. The resulting retroreflective article contained refracting elements similar to element 46 in FIG. 6.

Example 5B

The sheeting was made according to Example 5 except the application of pellets and forming into refracting elements was done at a web speed of 19.8 meters per minute. The resulting retroreflective article contained refracting elements similar to element 42 in FIG. 6.

Example 6

A retroreflective article was made according to Example 5 except:

In section A no pellets were made. In section B, NUCREL Brand 699 (a polyethylene methacrylic acid (EMAA) copolymer available from DuPont) was extruded onto a similar PET liner to make a 0.05 mm thick film with temperatures, speeds, etc. adjusted for that polymer and that film thickness. Section C was exactly the same except the primer used was ADCOTE Brand 50T4983 (a waterborne EAA (polyethylene acrylic acid) copolymer available from Morton Chemical Co.) and it was thinned with ethyl alcohol at 20 weight percent (wt %). In section D no anti-skid particles were used. Also, the refracting elements were made using SURLYN Brand 1702 (an ionically crosslinked EMAA available from DuPont). Again, a rubber based adhesive was applied to yield a retroreflective article which was then applied to a cement vertical barricade (often referred to as a "jersey barricade"). Again, reflection was excellent in both dry and wet environments.

Example 7

A colored retroreflective article was made according to Example 5 except that no rubber based adhesive has been applied to the conformance layer. This intermediate retroreflective sheeting was further processed to add a colorant using the following steps.

The intermediate retroreflective sheeting (comprising the base sheet, refracting elements and anti-skid particles, and conformance layer) was fed into the same hot can apparatus used in section C of Example 5 to deboss the existing 3-dimensional raised surface (of refracting elements and anti-skid particles) to yield as flat of a top surface as possible. The hot can was left off so that the processing was done at room temperature. The debossing was done by placing the refracting elements of the intermediate sheeting against the surface of the unheated hot can and running it through the pressure roller. During this action, the refracting elements and anti-skid particles were pressed into the aluminum foil conformance layer which can deform because it was held against the softer rubber pressure roller. The line speed was at 6.1 meters per minute; the pressure roller was set to 2310 kilograms; and the resultant debossed sheeting was wound up into a roll for storage. The debossed sheeting was unwound and printed with a white, opaque, gravure ink using a 100 line gravure roll and a line speed of 12.2 meters per minute. The printed debossed sheeting was dried through the same 5 ovens at temperatures of 65/79/93/107/121 (all in °C.). Higher nip roll pressure was used during this gravure printing operation in order to further deboss the sheeting and apply the ink to areas between the refracting elements and anti-skid particles. The pressure roller had a durometer of about 70 shore A, and the pressure was approximately 740 kilograms (using a 0.317 meter wide pressure roller).

The ink composition consisted of 78 wt % NEOREZ Brand R960 (available from Zeneca Resins, Wilmington, Mass.), 19 wt % WW3000 white colorant concentrate (available from Heucotech Ltd., Fairless Hills, Pa.), and 3 wt % CX100 crosslinker (also available from Zeneca). After coating and drying the ink, the sheeting was again wound up into a storage roll.

The printed, debossed sheeting was unwound and embossed at room temperature using the same technique to deboss the sheeting. However, in the embossed procedure, the aluminum conformance layer contacted the hot can. When the debossed sheeting ran through the pressure roller, the aluminum surface is re-flattened and the reflecting elements and anti-skid particles were raised back up to nearly their original 3-dimensional array. It was observed that ink had coated the top portion of all the refracting elements, the top portion of all of the anti-skid elements, and much of the flat area of the base sheeting between the anti-skid elements and the refracting elements. However, the sides of the refracting elements were left unprinted (because they were pushed down into the aluminum foil), and a large portion of the retroreflection was retained while the daytime whiteness of the sheeting was increased. Dry reflection was measured at 768, wet reflection was 670, while CapY was measured at 52 (compared to Example 5 without the printing which was measured to have a Cap Y of 47).

Example 8

A colored retroreflective article was made according to Example 5 up to Section C to yield an intermediate retroreflective sheeting (containing base sheeting, top film, and conformance layer). It was further processed to add a colorant using the following steps.

The top film of the intermediate sheeting was printed with the same white, opaque, gravure ink used in Example 7 using a spiral bar pattern gravure roll to yield a partially printed sheeting. The unprinted areas were represented as bars spaced 25.4 mm apart, 2.8 mm wide, and pitched at a 30° in the transverse direction. The sheeting was printed using common gravure printing techniques being sure to leave no ink in the unprinted areas, and then dried through the 5 ovens with temperatures of 65/79/93/107/121 (all °C.) and a line speed of 15.2 meters per minute. This printed intermediate sheeting was wound up into roll and stored. The gravure cells were made using a 100 line quadrangular engraving.

The partially printed intermediate sheeting was unwound and processed through the same series of ovens set at 232/232/232/232/off (all °C.). Pellets made in section A of Example 5 were sprinkled onto the web between the first and second ovens. During application of pellets to the partially printed intermediate sheeting, a vibration was imparted to the sheeting using a 32 mm square steel bar set against the backside of the web, and rotated at a speed of 1000 RPM. The vibrating bar caused the sprinkled pellets to bounce on the sheeting unless they contacted one of the unprinted areas. The printed areas were non-tacky at this condition because a thermoset ink was used. Due to the heat, the unprinted areas were softened and the pellets adhered selectively to the unprinted portions of the intermediate sheeting. The steel bar vibrated excess pellets off the sheeting, where they were collected and re-used. The selectively pellet coated sheeting continued through the ovens which melted the pellets into approximately hemispherical refracting elements. The sheeting was cooled in the in the fifth oven, which was deliberately turned off, and wound up into a storage roll. The resultant was a partially printed intermediate sheeting with refracting elements selectively adhered to unprinted regions. As a result of this process, the refracting elements did have some order to them.

This intermediate sheeting was further processed by applying anti-skid particles using a "kiss-coating" technique. Kiss-coating involved passing the sheeting through a two roll coater such that the lower roll rotated in a trough of solution. The solution on the roll was doctored off to a controlled thickness as it rotated out of the trough of solution. The intermediate sheeting passed through a fixed gap between the upper and lower roll such that the tops of the refracting elements contacted the controlled thickness solution of the lower roll. A portion of that solution was applied to the very top of the refracting elements.

The ink composition used contained 97 wt % Neorez R960 and 3 wt % CX100. The thickness of solution on the lower roll was approximately 0.3 mm. After the solution was kiss-coated onto the top portion of the refracting element, it was flood coated with an excess of the ceramic anti-skid particles. Excess particles were lightly vibrated off. Because the ink was still wet at this point, anti-skid particles preferably attached themselves to the ink area. The rest of the intermediate sheeting, being at room temperature and dry, had the particles knocked off. The intermediate sheeting entered into 5 zone ovens with temperatures all set at 65° C. The line speed was 12.2 meters per minute. The web sheeting then wound up into roll form. The ink, being fairly thick was not completely dried at this point, but continued to dry and subsequently cured at room temperature.

Example 9

A colored retroreflective article was made according to Example 5 with the following exceptions.

Yellow transparent dyes were added to both the top film and the refracting elements. When the refracting elements were made using the twin screw extruder, the colored formulation used consisted of 99.949 parts of L425.91 granular resin, 0.05 parts of Amaplast GHS (available from Colorchem International, Atlanta, Ga.), and 0.001 parts of Amaplast red LB (also available from Colorchem International). This combination produced reddish yellow pellets of excellent transparency.

To produce a colored top film, the formulation consisted of 99.135 parts of the L425.91 resin, 0.85 parts of the Amaplast GHS, and 0.015 parts of the AMAPLAST Brand Red LB. The extrusion conditions used to produce the top film was the same as in Example 5. However, the resulting top film had a strong reddish yellow with excellent transparency. All other steps were the same as for Example 5 and the resultant yellow retroreflective article had a strong yellow daytime color and excellent retroreflected color at night (night time color) under both dry and wet conditions.

Example 10

A retroreflective article was made according to Example 5 with the following exceptions.

The polymer pellets were prepared according to section A. Section B was not used. Subsequently, the 3750 sheeting was primed and laminated to the aluminum foil conformance layer in section C without the top film. The 3750 sheeting was primed according to section C. The top film and refracting elements were simultaneously formed using extrusion embossing techniques to yield a cover film, which was laminated to the primed 3750 sheeting attached to the aluminum foil.

To form the cover film, an embossing casting roll was made as follows. A 0.61 meter diameter wheel was drilled with rounded depressions using a 3.175 mm ball end mill at a depth of 1.4 mm. A pattern of depressions were drilled into the wheel such that when the refracting lenses were formed, they were tangentially arrayed to capture as much of the incoming light to the sheeting as possible. The longitudinal repeat pattern of depressions were set 50.8 mm apart so as to eliminate shadowing of the refracting elements when viewed 30 meters away such that an average vehicle's headlights strike the sheeting at an entrance angle of 88.76°. Staggering of depressions was also built into this pattern so that the extruded resin has as short of a distance as possible to move into a depression, while still maintaining the tangential and longitudinal relationships. Extrusion was done with a 31.75 mm extruder and with a casting die positioned above the patterned wheel. The gap between the die lips and the gap between the die and the casting wheel were adjusted so as to achieve adequate pressure to fill the depressions with melt and also to minimize the film thickness between the depressions. The depressions, once filled with extruded resin, functioned as the refracting elements. All elements were then connected by a continuous film. The combination of the two yielded a cover film.

Once formed, the cover film was combined with the primed 3750 sheeting as follows. The primed sheeting was first preheated to 149° C. The formed cover film was laminated to the primed sheeting in line to yield a retroreflective article containing refracting elements and its underlying film, base sheeting, and conformance layer. The speed of forming and bonding was 1.5 meters per minute with the extruder at 60 RPM.

Comparative Example A

A commercially available 3M SCOTCH-LANE Brand Series No. 620 pavement marking (available from 3M Company, St. Paul, Minn.) was used for comparison purposes. 620 is a flat, exposed-lens, removable pavement marking tape comprising (1) a $TiO_2$ pigmented binder wherein microspheres and anti-skid particles are embedded, (2) an aluminum foil conformance layer, and (3) a pressure sensitive adhesive with a scrim.

Comparative Example B

A commercially available 3M STAMARK Brand Series No. 380 pavement marking (available from 3M Company, St. Paul, Minn.) was used for comparison purposes. 380 is a profiled, durable marking tape comprising (1) a acrylonitrile rubber based conformance layer that has been embossed to create profiles typically in the form of truncated pyramids, (2) vertical profiled regions on the truncated pyramids wherein 1.75 refractive index microspheres are embedded and (3) a pressure sensitive adhesive for adhesion to a substrate, e.g., a roadway.

TABLE 3

| Example Number | Retroreflectivity ($R_L$) According to ASTM D 4061-94 | | | | Retroreflectivity ($R_L$) LTL 2000 | | Color (Cap Y) | Skid Resistance |
|---|---|---|---|---|---|---|---|---|
| | 30 METER | 50 METER | 80 METER | 120 METER | DRY | WET | | |
| 5 | 2124 | 4018 | 6655 | 8517 | 2260 | 1920 | 47 | 39 |
| 5A | 371 | 561 | 567 | 405 | 320 | 250 | 47 | 41 |
| 5B | 969 | 1564 | 1887 | 1800 | 1020 | 765 | 47 | 38 |
| 6 | | | | | | | 47 | not tested |
| 7 | 168 | 1403 | 2301 | 2358 | 750 | 670 | 52 | 38 |
| 8 | | | | | | | 60 | 84 |
| 9 | 1688 | 3051 | 4608 | 5267 | 1710 | 1450 | 31.5 | 46 |
| 10 | | | | | | | 48 | not tested |
| Comparative A | 949 | 976 | 988 | 582 | 930 | 60 | 85 | 58 |
| Comparative B | 763 | 902 | 1020 | 1042 | 835 | 110 | 75 | 45 |

Examples 5, 5A, and 5B show the effect of refracting element geometries on retroreflective brightness performance. When the refracting elements were nearly hemispherical as in Example 5 and as depicted by element 44 in FIG. 6, the highest brightness measurements were recorded. In contrast, when the refracting elements had flattened as in Example 5A and as depicted by element 42 in FIG. 6, the lowest retroreflective measurements were recorded. The trend was consistent for all distances, from 30 meters to 120 meters. In fact, hemispherical refracting elements performed about five to about twenty times better than flat refracting elements as compared at 30 meters and 120 meters respectively.

Similarly, hemispherical refracting elements in Example 5 performed better than nearly spherical refracting elements in Example 5B and as depicted by element 42 in FIG. 6. As Table 3 shows, hemispherical refracting elements performed about two to about four times better than nearly spherical refracting elements as compared at 30 meters and 120 meters respectively.

Furthermore, retroreflective brightness at all distances in Example 5 are surprisingly high. With increasing distance (i.e. increasing entrance angle), the inventive article of Example 5 shows higher retroreflective performance. Most conventional pavement marking tapes do not have such high retroreflective performance at the high entrance angles.

Glossary

The following definitions are used herein when discussing the geometry of retroreflection:

"Reference Axis" is the line normal to the retroreflective article at the point where light is incident thereto.

"Incidence Axis" is the axis defined by the path of incident light from the light source, e.g., the headlight of a motor vehicle, to the point of incidence on the article.

"Entrance Angle" (sometimes referred to as "Incidence Angle" and also as β) is the angle between the Reference Axis and the Incidence Axis.

"Observation Axis" is the axis defined by the path of retroreflected light from the point of incidence on the article to the observation point, e.g., the eyes of the driver of the motor vehicle.

"Observation Angle" (sometimes referred to as α) is the angle between the Entrance Axis and Observation Axis.

"Entrance Plane" is the plane defined by the Reference Axis and the Incidence Axis.

"Observation Plane" is the plane defined by the Observation Axis and the Incidence Axis.

Various modifications and alterations of this invention will become apparent to those skilled in the art without departing from the scope and spirit of this invention.

What is claimed is:

1. A retroreflective article comprising:
   (a) a retroreflective base sheet comprising an array of retroreflective elements and a cover layer having a top strata; and
   (b) an array of refracting elements adhered to the front surface of said base sheet such that some of the light incident to said array of refracting elements at an entrance angle above 85° is refracted so as to be transmitted directly into said base sheet, retroreflected by said base sheet, and further refracted by said refracting elements so as to be retroreflected by said article.

2. The article of claim 1 wherein at least the top strata of said cover layer and said refracting elements are of similar polymer family.

3. The article of claim 1 wherein said base sheet comprises at least one of the group consisting of embedded-lens retroreflective sheeting or encapsulated-lens retroreflective sheeting.

4. The article of claim 1 wherein the retroreflective brightness of said article at an entrance angle above 85° is higher than the retroreflective brightness of said article without said array of refracting elements.

5. The article of claim 1 further comprising anti-skid particles.

6. The article of claim 1 wherein at least some of said refracting elements comprise material selected from the group consisting of ceramic and polymeric material.

7. The article of claim 1 wherein at least some of said refracting elements comprise polymeric material selected from the group consisting of fluoropolymer, polycarbonate, acrylic, polyester, polyurethane, polyvinyl chloride, polyolefin copolymers, and blends thereof.

8. The article of claim 1 wherein at least some of said refracting elements comprise thermoplastic material.

9. The article of claim 1 wherein at least some of said refracting elements comprise aliphatic polyurethane.

10. The article of claim 1 wherein at least some of said refracting elements comprise polyethylene acid copolymer.

11. The article of claim 1 wherein at least some of said refracting elements have a Shore D Hardness of at least 45.

12. The article of claim 1 wherein said refracting elements are randomly shaped.

13. The article of claim 1 wherein at least some of said refracting elements have a rounded profile in horizontal cross section.

14. The article of claim 1 wherein at least some of said refracting elements have a rounded profile in vertical cross section.

15. The article of claim 1 wherein at least some of said refracting elements have substantially planar front surface in vertical cross section.

16. The article of claim 1 wherein at least some of said refracting elements have a rounded profile in both vertical and horizontal cross section.

17. The article of claim 16 wherein said refracting elements have a contact angle at their base of between about 45° and 135°.

18. The article of claim 16 wherein said refracting elements have a contact angle at their base between about 60° and about 110°.

19. The article of claim 1 wherein said refracting elements have an average height of between about 200 and 6000 microns.

20. The article of claim 1 wherein said refracting elements have an average height between about 1000 and 4000 microns.

21. The article of claim 1 wherein the average width at the base of said refracting elements is equal to about 2 to about 5 times the average height of said refracting elements.

22. The article of claim 1 wherein the portion of said refracting elements protruding above said front surface of said base sheet are hemispherical.

23. The article of claim 1 wherein said refracting elements are in the shape of less than fifty percent of a hemisphere.

24. The article of claim 1 wherein said refracting elements are in contact with less than fifty percent of the surface area of said retroreflective base sheet.

25. The article of claim 1 wherein said refracting elements are in contact with less than twenty-five percent of the surface area of said retroreflective base sheet.

26. The article of claim 1 wherein said refracting elements are randomly arranged on said front surface of said base sheet.

27. The article of claim 1 wherein said refracting elements are uniformly arranged on said front surface of said base sheet.

28. The article of claim 1 wherein said refracting elements are placed in a regular pattern on said front surface of said base sheet.

29. The article of claim 1 wherein some of said refracting elements include at least one sharpened portion positioned to increase skid resistance.

30. The article of claim 1 wherein said refracting elements are truncated pyramids.

31. The article of claim 30 wherein at least one side edge of said pyramids is straight and makes a contact angle with said base sheet of between about 30° and about 70°.

32. The article of claim 1 wherein said base sheet comprises an embedded-lens retroreflective sheeting comprising a monolayer of transparent microspheres, a cover layer in which the front surfaces of said microspheres are embedded, and associated reflective means behind said microspheres, said refracting elements being adhered to said cover layer.

33. The article of claim 1 wherein said base sheet comprises an encapsulated-lens retroreflective sheeting comprising a monolayer of transparent microspheres partially embedded in a binder layer with a retroreflective layer on the rear portions thereof and a cover layer disposed in front of the microsphere, said cover layer and binder layer being bonded together with a network of interconnecting bonds.

34. The article of claim 1 wherein said base sheet comprises a monolayer of cube-corner retroreflective elements.

35. The article of claim 1 further comprising a colorant in at least one of the group consisting of said refracting elements, said cover layer, and a layer on said cover layer.

36. The article of claim 1 further comprising a discontinuous colorant containing layer covering the top portions of at least some of said refracting elements and portions of said cover layer between said refracting elements.

37. A method for making a retroreflective article comprising
  (a) providing a retroreflective base sheet comprising an array of retroreflective elements and a cover layer;
  (b) adhering an array of refracting elements on the front surface of said cover layer such that some of the light incident to said array of refracting elements at an entrance angle above 85° is refracted so as to be transmitted directly into said base sheet, retroreflected by said base sheet, and further refracted by said refracting elements so as to be retroreflected by said article.

38. The method of claim 37 wherein said adhering an array of refracting elements comprises depositing pellets of thermoplastic resin to the front surface of said base sheet then heating said pellets such that said pellets deform to form said refracting elements, then cooling the article such that said refracting elements are bonded to said front surface.

39. The method of claim 37 comprising forming a top film and said array of refracting elements simultaneously to yield a cover film and laminating said cover film to said base sheet.

40. The method of claim 39 wherein forming said cover film comprises extrusion embossing.

41. The method of claim 39 wherein forming said cover film comprises cast and cure processing.

42. The method of claim 37 further comprising at least one of the group consisting of incorporating at least one colorant in said refracting elements, incorporating at least one colorant in said cover layer, or incorporating at least one colorant in a layer formed on said cover layer.

* * * * *